(12) United States Patent
Gaertner et al.

(10) Patent No.: US 9,001,365 B2
(45) Date of Patent: Apr. 7, 2015

(54) CONFLICT RESOLUTION AND OPTIMIZATION FOR JOB DEFINITION FORMAT INSTRUCTIONS

(71) Applicants: Joseph P. Gaertner, Lafayette, CO (US); Michael Lotz, Longmont, CO (US); Thomas Margolis, Boulder, CO (US); Jeffrey Sikkink, Longmont, CO (US)

(72) Inventors: Joseph P. Gaertner, Lafayette, CO (US); Michael Lotz, Longmont, CO (US); Thomas Margolis, Boulder, CO (US); Jeffrey Sikkink, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 13/783,630

(22) Filed: Mar. 4, 2013

(65) Prior Publication Data

US 2014/0247460 A1 Sep. 4, 2014

(51) Int. Cl.
*G06F 3/12* (2006.01)
(52) U.S. Cl.
CPC ......................................... *G06F 3/12* (2013.01)
(58) Field of Classification Search
None
See application file for complete search history.

(56) References Cited

U.S. PATENT DOCUMENTS

| | | | |
|---|---|---|---|
| 7,821,662 B2 | 10/2010 | Matsueda | |
| 8,164,782 B2 | 4/2012 | Ocke et al. | |
| 8,218,173 B2 | 7/2012 | Kuroshima | |
| 8,284,426 B2 | 10/2012 | Lankreijer et al. | |
| 2003/0189725 A1 | 10/2003 | Kloosterman et al. | |
| 2004/0111418 A1* | 6/2004 | Nguyen et al. | 707/100 |
| 2005/0210227 A1* | 9/2005 | Emerson et al. | 713/1 |
| 2007/0233543 A1* | 10/2007 | Oshima | 705/8 |
| 2007/0268513 A1* | 11/2007 | Enloe | 358/1.15 |
| 2008/0151284 A1* | 6/2008 | Morales et al. | 358/1.15 |
| 2009/0262396 A1* | 10/2009 | Furuya | 358/1.15 |
| 2009/0279133 A1 | 11/2009 | Nakatsuka | |
| 2009/0316180 A1* | 12/2009 | Nakagawa | 358/1.14 |
| 2010/0085594 A1 | 4/2010 | Williams | |
| 2010/0195124 A1* | 8/2010 | Has | 358/1.9 |
| 2010/0245884 A1* | 9/2010 | Komine | 358/1.15 |
| 2011/0002006 A1 | 1/2011 | Toriumi | |
| 2011/0075195 A1 | 3/2011 | Cain | |
| 2011/0080604 A1 | 4/2011 | Liu | |
| 2011/0222107 A1* | 9/2011 | Williams | 358/1.15 |
| 2012/0019866 A1 | 1/2012 | Kuroshima | |
| 2012/0105912 A1* | 5/2012 | Morooka | 358/1.15 |
| 2012/0188571 A1 | 7/2012 | Amano | |
| 2012/0218577 A1 | 8/2012 | Dumitrescu et al. | |
| 2013/0016389 A1 | 1/2013 | Robinson | |

* cited by examiner

*Primary Examiner* — King Poon
*Assistant Examiner* — Vincent Peren
(74) *Attorney, Agent, or Firm* — Duft Bornsen & Fettig LLP

(57) ABSTRACT

Systems and methods are provided for addressing conflicts when merging Job Definition Format (JDF) instructions. The system includes a memory that stores rules for prioritizing Job Definition Format (JDF) instructions. The system also includes a controller able to receive a print job and to identify multiple sets of JDF instructions for the print job. The controller is further able to generate a merged set of JDF instructions from the JDF instructions in each of the identified sets, and to identify conflicts within the merged set between JDF instructions that share page ranges with each other. The controller is also able to resolve the conflicts by altering JDF instructions based on the rules stored in memory.

20 Claims, 8 Drawing Sheets

CONFLICT RESOLUTION AND OPTIMIZATION FOR JOB DEFINITION FORMAT INSTRUCTIONS

FIELD OF THE INVENTION

The invention relates to the field of printing, and in particular, to print jobs that utilize Job Definition Format (JDF) job tickets.

BACKGROUND

Print shops are typically medium or large scale facilities capable of supplying printing services to meet a variety of customer demands. For example, print shops are often used to print documents for mass-mailing (e.g., customer bills, advertisements). Because print shops engage in printing on a large scale, their customer base is usually varied. Print shop customers may therefore include both large institutional clients (e.g., credit card companies), and small customers (e.g., small businesses).

Print shops are generally arranged to print incoming jobs from customers in a way that is economical and yet fast. Thus, print shops often include high-volume printers capable of printing incoming jobs quickly and at high quality. Print shops also typically include post-printing devices (e.g., stackers, staplers, cutters, binders) that are used to process the printed documents of each job. Because print shops serve a variety of customers, they are often tasked with processing jobs that have varying printing formats, delivery dates, and media requirements. Print shops therefore often use a centralized print server that coordinates activity between printers and other devices of the print shop.

Along with the print data itself, a print job may include a Job Definition Format (JDF) job ticket describing how the print data for the job should be processed (e.g., what print media to use, what ink to use, whether to bind, staple, or stack the job). While it remains useful for a customer to generate JDF job tickets on a print job by print job basis, the process is not optimally efficient when a customer submits many print jobs. The customer has to generate new job tickets each time a new print job is created, which can be time-consuming. Customers therefore continue to look for systems that streamline the creation of JDF job tickets for print jobs.

SUMMARY

Embodiments described herein provide printing systems that are capable of combining multiple JDF job tickets into a single job ticket for a printing system. Furthermore, embodiments herein can resolve conflicts between JDF instructions in a combined job ticket in order to ensure that the combined job ticket will be properly processed by the printing system. Thus, customers can merge multiple print jobs (each with a different set of JDF instructions) together into a single print job without worrying about job ticket conflicts. This in turn increases the flexibility of the printing system.

One embodiment is a system that includes a memory that stores rules for prioritizing Job Definition Format (JDF) instructions. The system also includes a controller able to receive a print job and to identify multiple sets of JDF instructions for the print job. The controller is further able to generate a merged set of JDF instructions from the JDF instructions in each of the identified sets, and to identify conflicts within the merged set between JDF instructions that share page ranges with each other. The controller is also able to resolve the conflicts by altering JDF instructions based on the rules stored in memory.

Another embodiment is a method. The method includes receiving a print job at a print server, and identifying multiple sets of Job Definition Format (JDF) instructions for the print job. The method also includes generating a merged set of JDF instructions from the JDF instructions in each of the identified sets, and identifying conflicts within the merged set between JDF instructions that share page ranges with each other. Further, the method includes resolving the conflicts by altering JDF instructions based on prioritization rules stored in a memory of the print server.

Another embodiment is a non-transitory computer-readable medium embodying programmed instructions which, when executed by a processor, are operable for performing a method. The method includes receiving a print job at a print server, and identifying multiple sets of Job Definition Format (JDF) instructions for the print job. The method also includes generating a merged set of JDF instructions from the JDF instructions in each of the identified sets, and identifying conflicts within the merged set between JDF instructions that share page ranges with each other. Further, the method includes resolving the conflicts by altering JDF instructions based on prioritization rules stored in a memory of the print server.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically-recited examples and conditions. As a result, the invention is not limited to the specific embodiments or examples described below, but by the claims and their equivalents.

Figure 1:
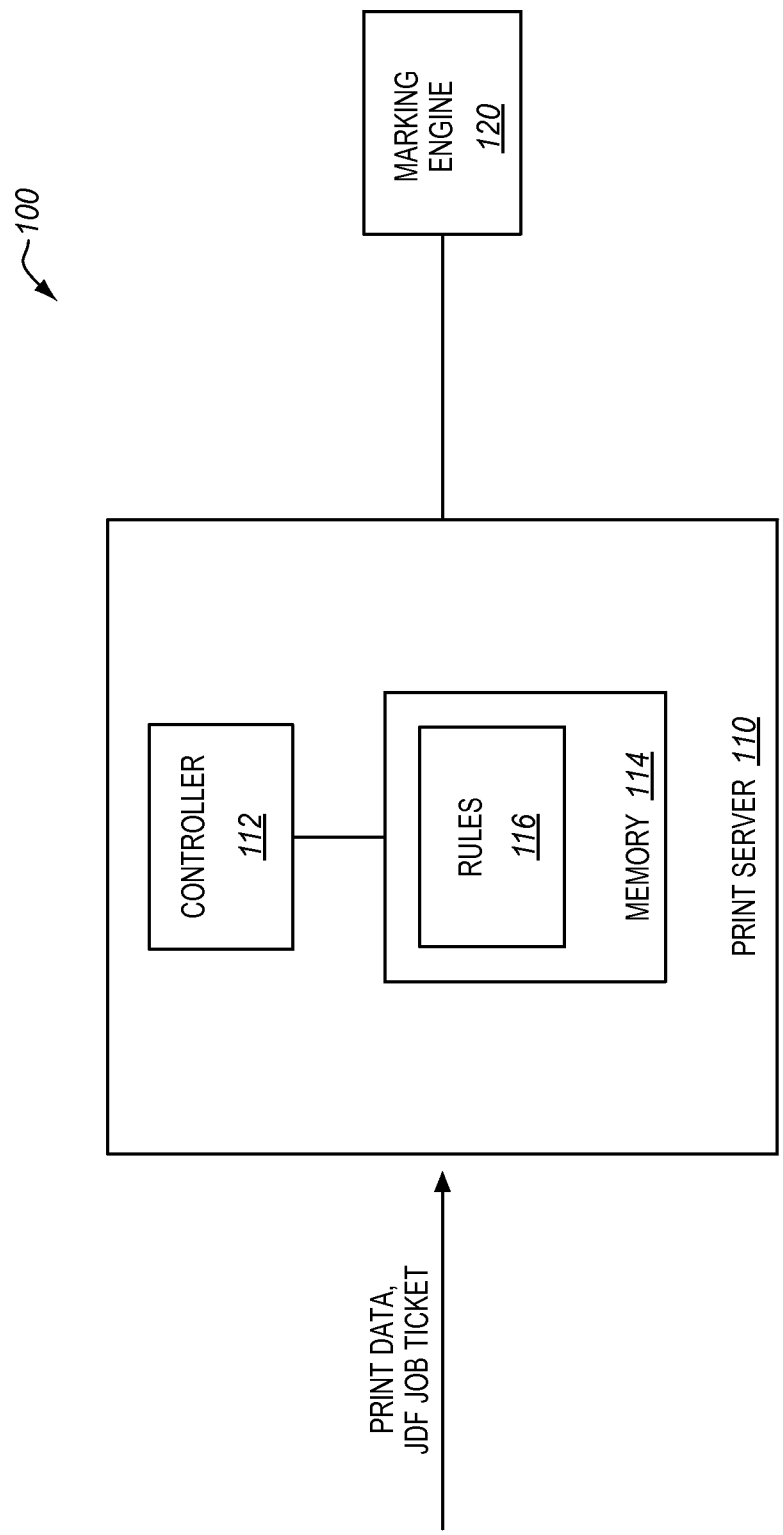
FIG. 1 is a block diagram of a printing system in an exemplary embodiment.

FIG. 1 is a block diagram of a printing system 100 in an exemplary embodiment. Printing system 100 includes print server 110. Print server 110 receives incoming print jobs from customers (e.g., via an Ethernet or wireless interface), and also receives Job Definition Format (JDF) job tickets that indicate how to process the incoming print jobs. Print server 110 processes the print data for the job as well as the job ticket instructions in order to direct the operations of marking engine 120 as it prints. Print server 110 may further direct how printed output from marking engine 120 is processed (e.g., hole-punched, stapled, stacked, etc.), based on the job ticket instructions.

In this embodiment, print server 110 includes controller 112 and memory 114. Controller 112 directs the operations of print server 110, and has been enhanced to merge multiple JDF job tickets into a single, error-free JDF job ticket. Controller 112 resolves conflicts between instructions in the JDF job tickets based on rules 116 stored in memory 114. The rules define which JDF instructions have the highest priority. Controller 112 may be implemented as custom circuitry, as a processor executing programmed instructions stored in program memory, or some combination thereof.

Marking engine 120 comprises any system, component, or device operable to mark pages of print media. For example, marking engine 120 may comprise a continuous forms inkjet printing system, an office laser printer, etc.

Illustrative details of the operation of printing system 100 will be discussed with regard to FIG. 2. Assume, for this embodiment, that print server 110 is awaiting the receipt of new print jobs for processing. Further, assume that a customer has decided to submit their print job for printing. In one embodiment, the print job comprises multiple files of print data, and multiple JDF job tickets (one for each file of print data). The customer then indicates to print server 110 that mail pieces (e.g., credit card statements) from each file should be combined together, and further indicates that the JDF instructions from the job tickets should be merged/combined to match the combined print data.

Figure 2:
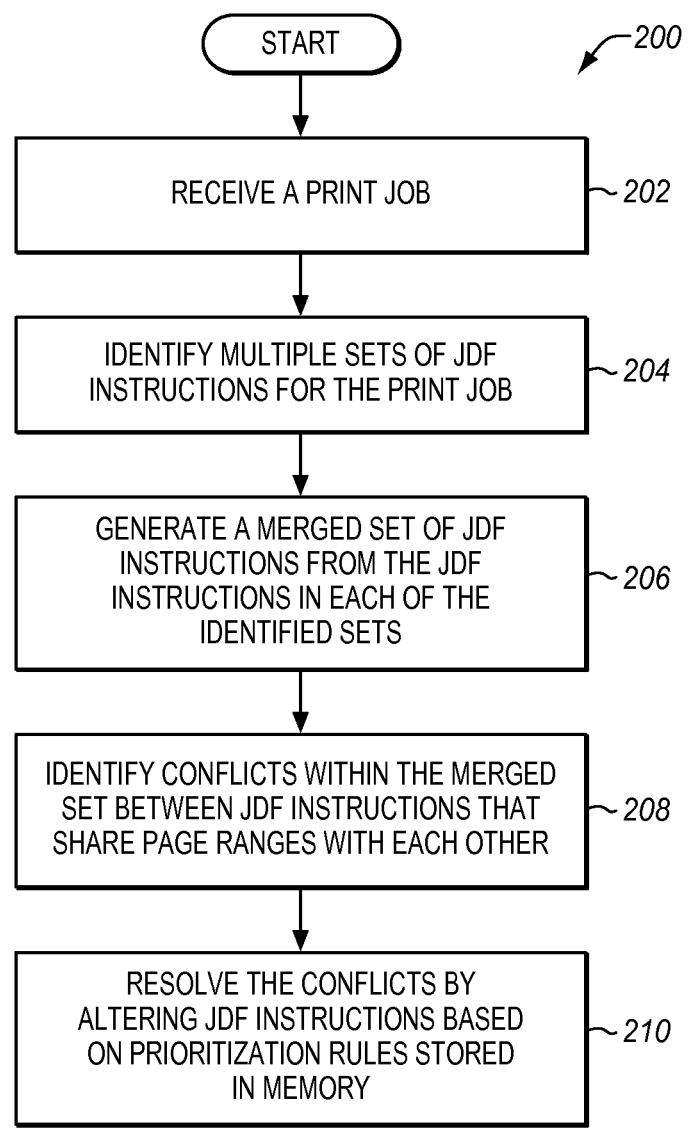
FIG. 2 is a flowchart illustrating a method for operating a printing system to merge JDF instructions in an exemplary embodiment.

FIG. 2 is a flowchart illustrating a method 200 for operating a printing system to merge JDF instructions in an exemplary embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 of print server 110 receives a print job. The print job may include rasterized content and/or Page Description Language (PDL) content for printing. For example, the print job may comprise a Portable Document Format (PDF) print job. In one embodiment, the print job is made up of multiple documents (e.g., mail pieces such as credit card statements) that have been pulled from different files. Each file is correlated with a different set of JDF instructions.

In step 204, controller 112 identifies/acquires multiple sets of JDF instructions for the print job. In one embodiment, each set of JDF instructions is received along with the print job. For example, each set of JDF instructions may be a job ticket for a different file or set of mail pieces. In one embodiment, controller 112 generates its own set of JDF instructions to complement instructions that were received with the print job.

In step 206, controller 112 generates a merged set of JDF instructions from the JDF instructions in each of the multiple sets. As a part of this process, controller 112 may "normalize" the JDF instructions to ensure that the pages referred to in each of the JDF instructions accurately reflect the actual pages of the print job. For example, in an embodiment where print data from multiple files has been combined together to form the print job, the JDF instructions (which at first correspond to the original files, and not the combined print data) may use the page numbers for the original files from which the print data was acquired, instead of the page numbers of the newly assembled print job. Therefore, the JDF instructions may have their page numbers revised so that they correspond with the appropriate locations within the combined print data.

In step 208, controller 112 identifies conflicts within the merged set of JDF instructions. Conflicts are found whenever JDF instructions for the same page indicate mutually exclusive parameters. A mutually exclusive set of JDF instructions is a set of instructions that cannot be performed together without resulting in an error. For example, if one JDF instruction indicates that a page should use A4 size media, and another JDF instruction indicates that the same page should use letter size media, a conflict exists. Similarly, a conflict may exist where a stapling instruction overlaps in page range with another existing stapling instruction.

In step 210, controller 112 resolves the conflicts by altering JDF instructions based on prioritization rules 116 stored in memory 114. These rules may define which types of JDF instructions have priority over other types of JDF instructions. For example, rules 116 may indicate that one set of JDF instructions has priority over another set of JDF instructions, may indicate that one set of global JDF instructions has priority over other global JDF instructions, may indicate that Page Level Exceptions (PLEs) for one set of JDF instructions have priority over another set of JDF instructions, etc. In one embodiment, the type of JDF command or the type of parameter defined by the JDF command is associated with a specific priority. As a part of resolving the conflicts, controller 112 may revise the page ranges of low priority PLEs so that the low priority PLEs no longer conflict with the high priority PLEs.

In print jobs that define multiple mail pieces or other documents, the conflict detection and resolution process described in steps 208-210 may be performed on a document-by-document basis within the print job.

Using the method of FIG. 2, multiple job tickets for print jobs can be quickly and efficiently merged without error. This allows a user to more flexibly define the manner in which a print job should be processed by a printer and/or post-processing equipment.

Figure 3:
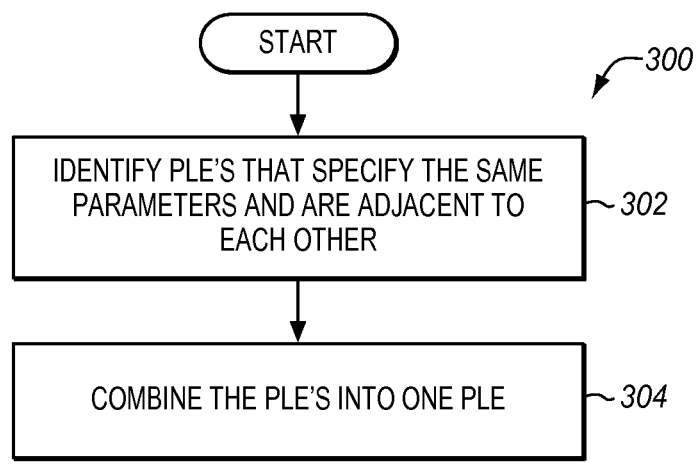
FIG. 3 is a flowchart illustrating a method for optimizing a job ticket for a print job to reduce the number of Page Level Exceptions (PLEs) in an exemplary embodiment.

FIG. 3 is a flowchart illustrating a method for optimizing a job ticket for a print job to reduce the number of Page Level Exceptions (PLEs) in an exemplary embodiment. In cases where a job ticket has been conflict-resolved but has not yet been optimized, the PLEs no longer cause errors. However, the sheer volume of PLEs in the print job may increase the processing time for the print job at a printer. Therefore, after the job ticket has been merged and conflicts for the job ticket have been resolved, the job ticket may be optimized to reduce the number of PLEs. If multiple PLEs can be merged together, the processing time for the print job at the printer can be reduced. Simply put, by reducing the number of page level exceptions, FIG. 3 allows a merged job ticket for a print job to be streamlined for faster processing by a printing system.

According to FIG. 3, in step 302 controller 112 identifies PLEs that specify the same parameters and are adjacent to each other. Adjacent PLEs define parameters for pages that are next to each other. For example, a first PLE may indicate a media type of letter for pages 1-5, and another PLE may indicate a media type of letter for pages 6-7. Step 302 may further include identifying PLEs that specify the same parameters and overlap each other. For example, if two neighboring PLEs indicate that the same special type of ink should be used, those PLEs can be merged into a single PLE for the combined page range of the original PLEs.

In step 304, controller 112 combines PLEs identified in step 302 as being concatenatable into one PLE. Since printers encounter reduced performance when they process multiple PLEs, reducing the number of PLEs in the merged job ticket serves to increase the speed of the printer as it prints the job.

Figure 4:
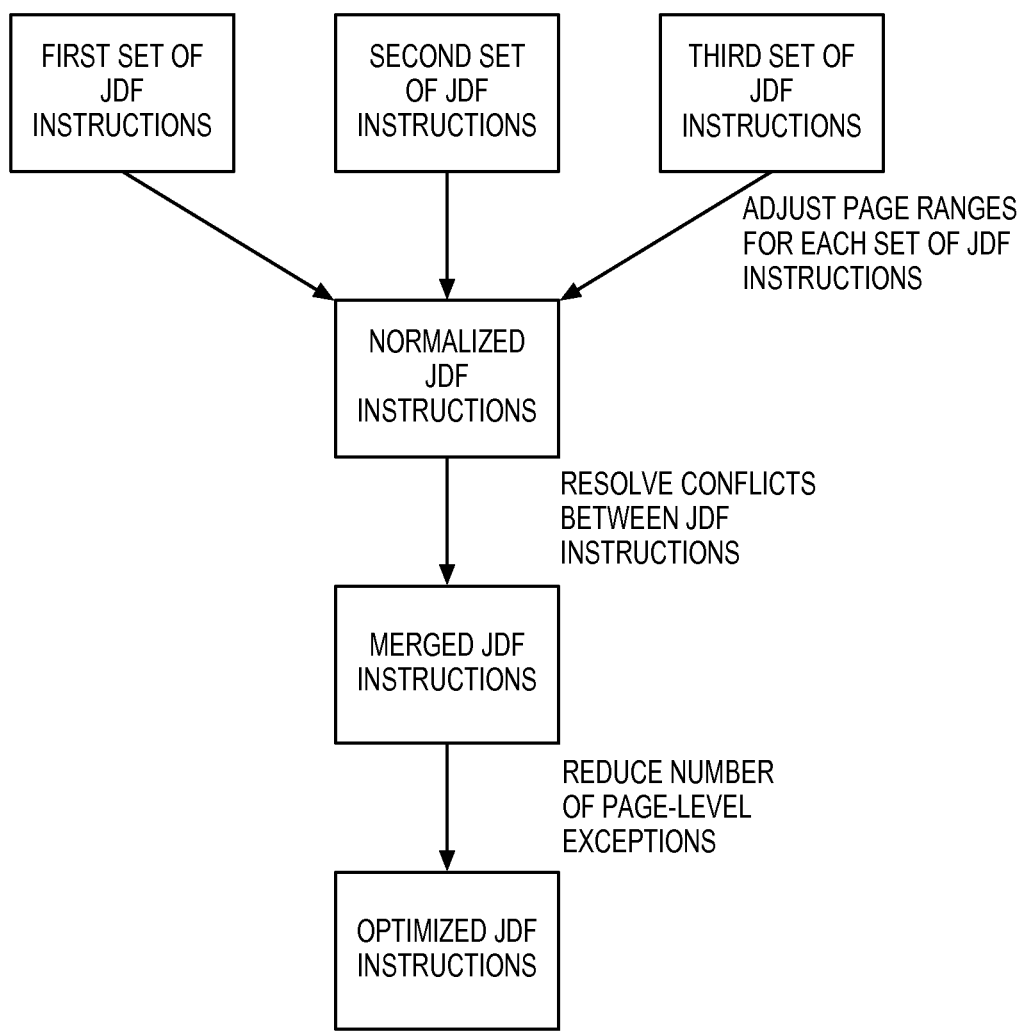
FIG. 4 is a block diagram illustrating an exemplary integration of multiple sets of JDF instructions into a merged set of JDF instructions.

FIG. 4 is a block diagram 400 illustrating an exemplary integration of multiple sets of JDF instructions into a merged/combined set of JDF instructions. In a broad sense, FIG. 4 shows an embodiment where JDF instructions are first altered, so that the page numbers in each PLE (regardless of their original job ticket) use the same page numbers to represent the same pages. This is referred to as normalizing the JDF instructions. Once the JDF instructions are normalized, they can be merged together into a uniform set of JDF instructions. The merged JDF instructions can then be checked for conflicts and revised, and finally may be optimized to reduce the number of overall PLEs in the job ticket.

EXAMPLES

In the following examples, additional processes, systems, and methods are described in the context of a printing system that identifies and addresses JDF conflicts when merging JDF job tickets.

Figure 5:
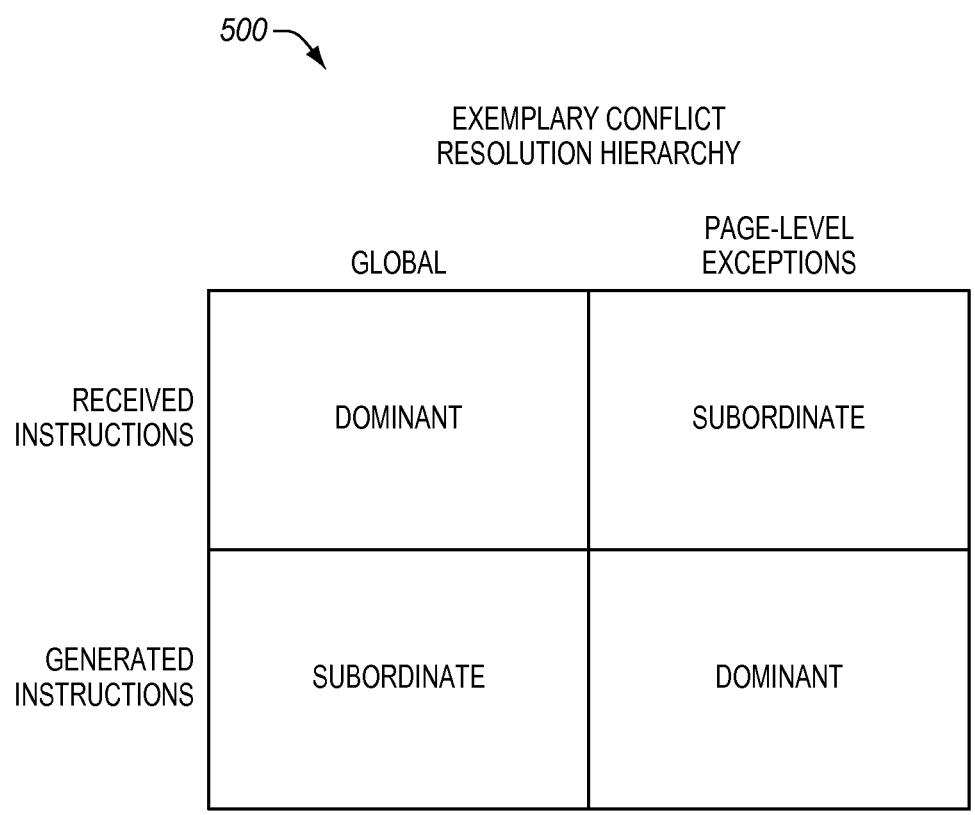
FIG. 5 is a block diagram illustrating an exemplary set of prioritization rules for JDF instructions.

FIG. 5 is a block diagram 500 illustrating an exemplary set of prioritization rules for JDF instructions. In this embodiment, a print server generates its own set of JDF instructions for a print job, based upon the identity of a customer that submitted the print job. The print server merges the generated JDF instructions with a set of instructions that have been received for the print job. According to FIG. 5, the prioritization rules indicate which rules are dominant over other rules. The page ranges of low priority rules are then revised to eliminate conflicts with high priority rules. In JDF, global instructions are subordinate to Page Level Exceptions (PLEs). FIG. 5 shows that when comparing conflicting global instructions, this particular set of rules indicates that received instructions should be dominant to the generated ones. However, FIG. 5 also shows that according to these rules, when comparing conflicting PLEs, generated instructions should be dominant to received ones.

Figure 6:
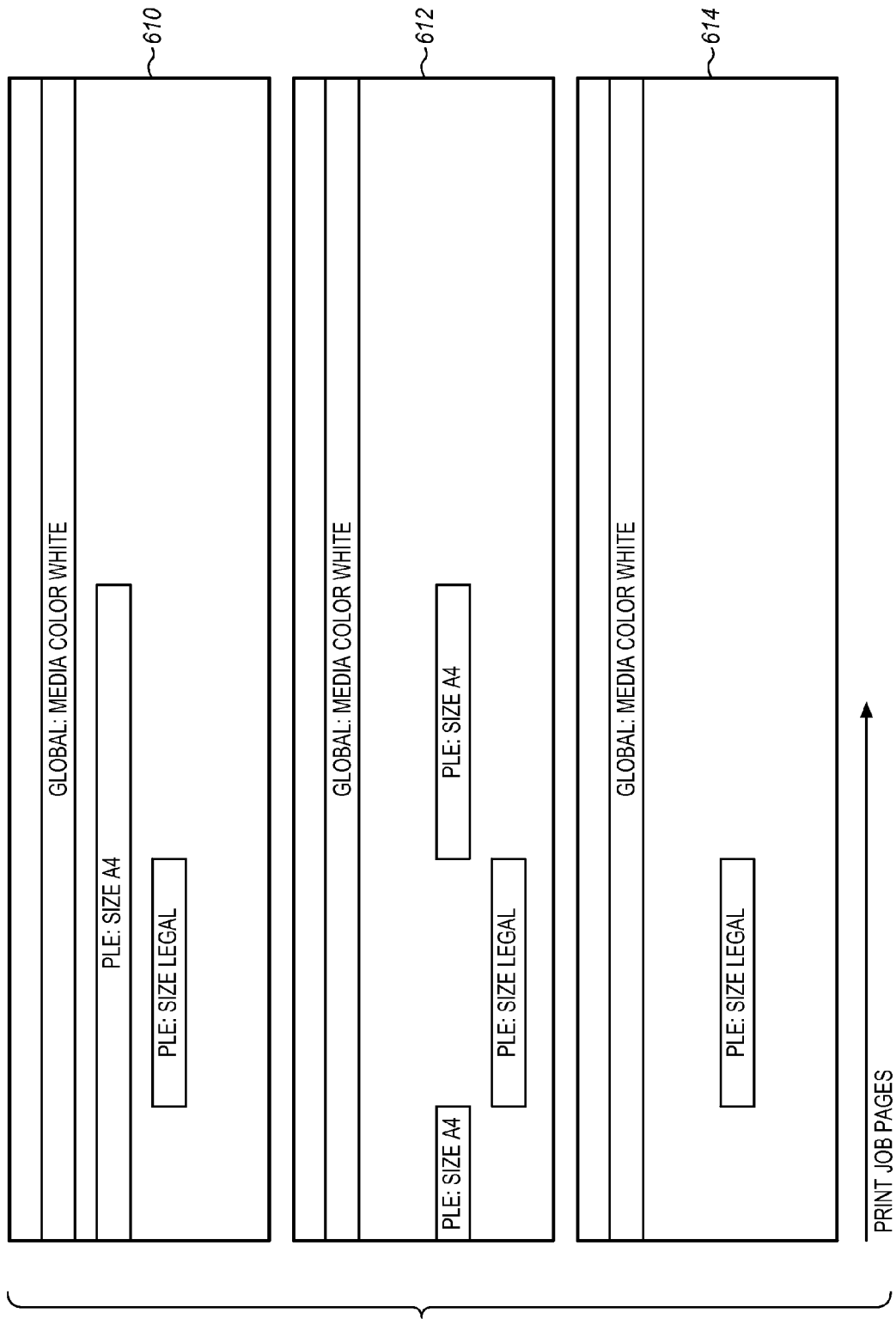
FIG. 6 is a further block diagram illustrating exemplary modifications to JDF Page Level Exceptions (PLEs) within a job ticket.

FIG. 6 is a further block diagram illustrating exemplary modifications to JDF Page Level Exceptions (PLEs) within a job ticket. FIG. 6 illustrates an example of the merging discussed in the method of FIG. 2. According to FIG. 6, in a normalized set of JDF instructions 610, a high priority PLE (Page Size: Legal) is entirely within the range of a lower priority PLE (Page Size: A4). To address this issue, a controller of a print server can modify the low priority PLE to split it into multiple PLEs that do not overlap the high priority PLE. This is shown in set of JDF instructions 612. Alternatively, the print server may resolve the conflict by simply removing the low-priority PLE completely, as shown in set of JDF instructions 614.

Figure 7:
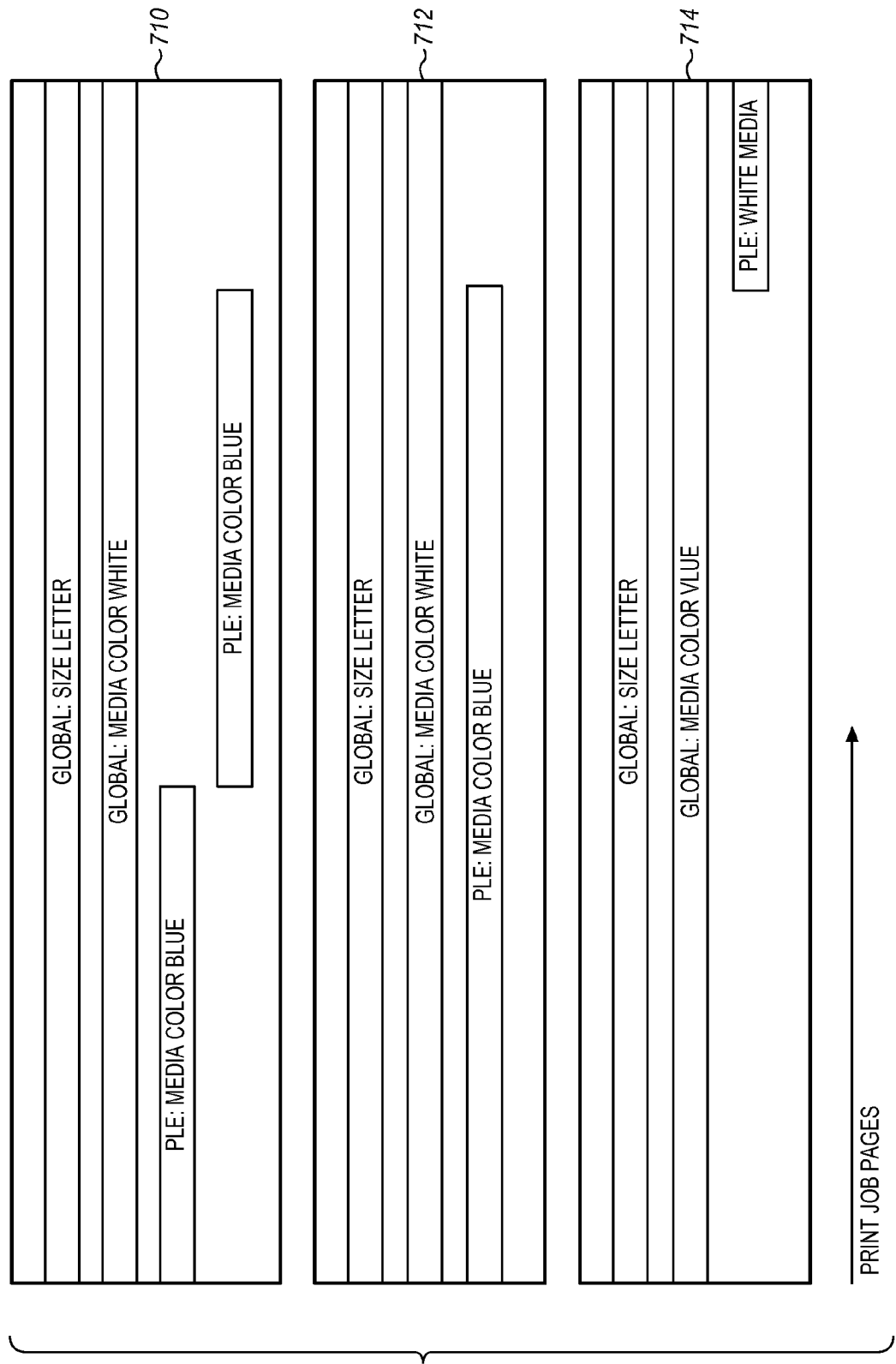
FIG. 7 is a block diagram illustrating exemplary modifications to JDF Page Level Exceptions (PLEs) within a job ticket.

FIG. 7 is a block diagram illustrating exemplary modifications to JDF Page Level Exceptions (PLEs) within a job ticket. FIG. 7 illustrates an example of the optimization method described with regard to FIG. 3. According to FIG. 7, a merged JDF 710 includes multiple global level JDF instructions, as well as multiple PLEs. However, there are multiple PLEs that could be merged to reduce the overall number of PLEs in the print job. Here, the two PLEs both indicate a media color of blue, and are both adjacent to each other. Thus, an optimized set of JDF instructions 712 may be created that merge both of the PLEs into a single PLE. Similarly, if the PLEs that indicate the same parameter occupy a majority of the pages of the print job (or if the overall number of PLEs in the print job can be reduced), some PLEs may be changed to create a global JDF instruction as shown in 714, and the global instruction may then be converted into a PLE. This may be appropriate in situations where PLEs for the job indicate the same parameter for a majority of pages of the job. Similar operations may be performed for overlapping PLEs that request the same parameter.

Figure 8:
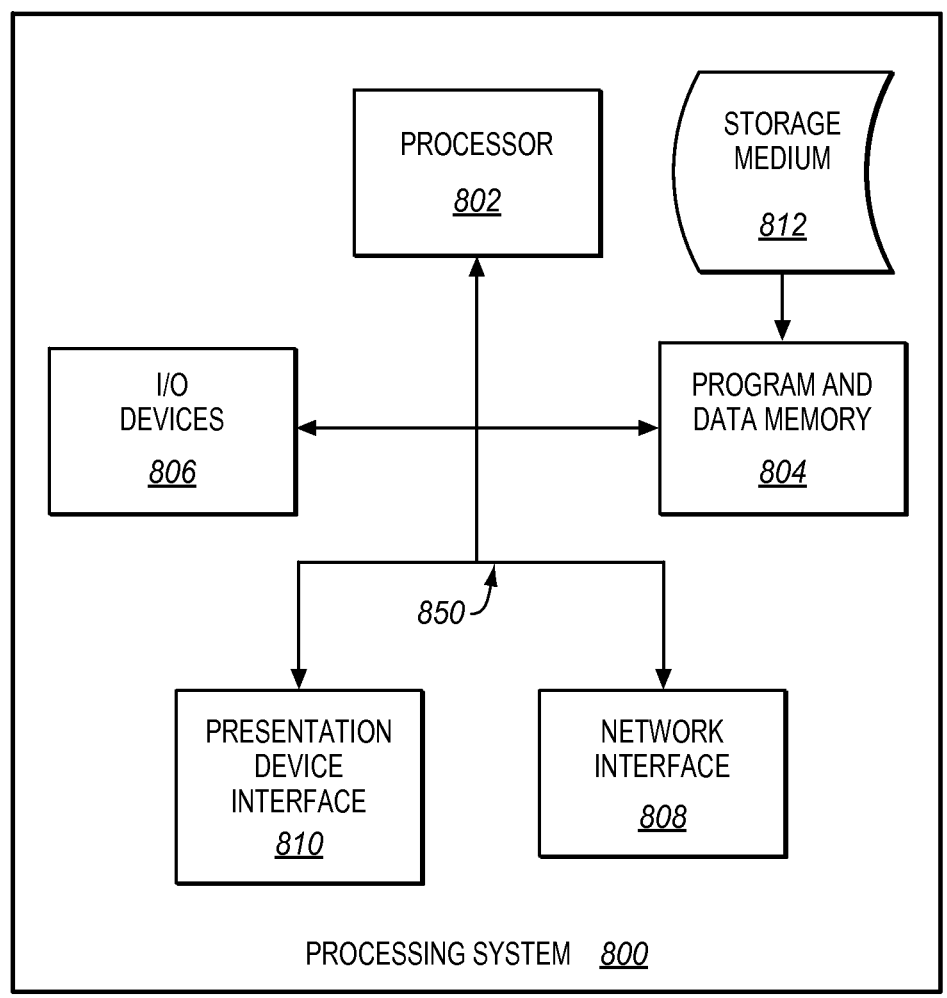
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 110 to perform the various operations disclosed herein. FIG. 8 illustrates a processing system 800 operable to execute a computer readable medium embodying programmed instructions to perform desired functions in an exemplary embodiment. Processing system 800 is operable to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A system comprising:
a memory that stores rules for prioritizing Job Definition Format (JDF) instructions; and
a controller operable to receive a print job, to identify multiple sets of JDF instructions for the print job, to create a merged set of JDF instructions from the JDF instructions in each of the identified sets, to identify conflicts within the merged set between JDF instructions that share page ranges with each other, and to resolve the conflicts by altering the merged set of JDF instructions based on the rules stored in memory,
wherein the multiple sets of JDF instructions include a set of JDF instructions received at the system and a set of JDF instructions generated by the system, and wherein the rules define whether received JDF instructions take priority over generated JDF instructions.

2. The system of claim 1 wherein:
the controller is further operable to alter JDF instructions by identifying JDF Page Level Exceptions (PLEs) that are mutually exclusive and that share page ranges with each other, analyzing the rules to determine which mutually exclusive PLE has the higher priority, and altering the PLE with the lower priority to remove it from the shared page range.

3. The system of claim 2 wherein:
The controller is further operable to remove the lower priority PLE from the shared page range by altering a starting page of the lower priority PLE.

4. The system of claim 2 wherein:
The controller is further operable to remove the lower priority PLE from the shared page range by altering an ending page of the lower priority PLE.

5. The system of claim 2 wherein:
the entirety of the higher priority PLE is within the page range of the lower priority PLE, and
the controller is further operable to remove the lower priority PLE from the shared page range by splitting the lower priority PLE into two PLEs that are each adjacent to the higher priority PLE and that each do not overlap the higher priority PLE.

6. The system of claim 1 wherein:
the controller is further operable to analyze the merged set of JDF instructions to identify Page Level Exceptions (PLEs) that specify the same parameters and are adjacent to each other, and to combine identified PLEs into one PLE.

7. The system of claim 1 wherein:
the controller is further operable to analyze the merged set of JDF instructions to identify Page Level Exceptions (PLEs) that specify the same parameters and occupy a majority of the pages of the print job, and to convert the identified PLEs into a single global command for the print job to reduce the total number of PLEs in the print job.

8. The system of claim 1 wherein:
the print job is segmented into multiple documents; and
the controller is further operable to resolve conflicts between JDF instructions for each document.

9. The system of claim 1 wherein:
the memory stores rules for generating JDF instructions; and
the controller is further operable to generate a set of JDF instructions for the print job, wherein the multiple sets of JDF instructions include the generated set of JDF instructions.

10. A method comprising:
receiving a print job at a print server;
identifying multiple sets of Job Definition Format (JDF) instructions for the print job;
creating a merged set of JDF instructions from the JDF instructions in each of the identified sets;
identifying conflicts within the merged set between JDF instructions that share page ranges with each other; and
resolving the conflicts by altering the merged set of JDF instructions based on prioritization rules stored in a memory of the print server,
wherein the multiple sets of JDF instructions include a set of JDF instructions received at the print server and a set of JDF instructions generated by the print server, and wherein the rules define whether received JDF instructions take priority over generated JDF instructions.

11. The method of claim 10 further comprising:
altering JDF instructions by:
identifying JDF Page Level Exceptions (PLEs) that are mutually exclusive and that share page ranges with each other;
analyzing the rules to determine which mutually exclusive PLE has the higher priority; and
altering the PLE with the lower priority to remove it from the shared page range.

12. The method of claim 11 further comprising:
removing the lower priority PLE from the shared page range by altering a starting page of the lower priority PLE.

13. The method of claim 11 further comprising:
removing the lower priority PLE from the shared page range by altering an ending page of the lower priority PLE.

14. The method of claim 11 wherein:
the entirety of the higher priority PLE is within the page range of the lower priority PLE, and the method further comprises:
removing the lower priority PLE from the shared page range by splitting the lower priority PLE into two PLEs that are each adjacent to the higher priority PLE and that each do not overlap the higher priority PLE.

15. The method of claim 10 further comprising:
analyzing the merged set of JDF instructions to identify Page Level Exceptions (PLEs) that specify the same parameters and are adjacent to each other; and
combining identified PLEs into one PLE.

16. The method of claim 10 further comprising:
analyzing the merged set of JDF instructions to identify Page Level Exceptions (PLEs) that specify the same parameters and occupy a majority of the pages of the print job; and
converting the identified PLEs into a single global command for the print job to reduce the total number of PLEs in the print job.

17. The method of claim 10 wherein:
the print job is segmented into multiple documents, and the method further comprises resolving conflicts between JDF instructions for each document.

18. A non-transitory computer-readable medium embodying programmed instructions which, when executed by a processor, are operable for performing a method comprising:
  receiving a print job at a print server;
  identifying multiple sets of Job Definition Format (JDF) instructions for the print job;
  creating a merged set of JDF instructions from the JDF instructions in each of the identified sets;
  identifying conflicts within the merged set between JDF instructions that share page ranges with each other; and
  resolving the conflicts by altering the merged set of JDF instructions based on prioritization rules stored in a memory of the print server,
  wherein the multiple sets of JDF instructions include a set of JDF instructions received at the print server and a set of JDF instructions generated by the print server, and wherein the rules define whether received JDF instructions take priority over generated JDF instructions.

19. The medium of claim 18 wherein the method further comprises:
  altering JDF instructions by:
    identifying JDF Page Level Exceptions (PLEs) that are mutually exclusive and that share page ranges with each other;
    analyzing the rules to determine which mutually exclusive PLE has the higher priority; and
    altering the PLE with the lower priority to remove it from the shared page range.

20. The medium of claim 18 wherein the method further comprises:
  removing the lower priority PLE from the shared page range by altering a starting page of the lower priority PLE.

* * * * *